United States Patent [19]

Oba et al.

[11] Patent Number: 5,560,988
[45] Date of Patent: Oct. 1, 1996

[54] GAS BARRIER LAMINATE AND PRODUCTION PROCESS THEREOF

[75] Inventors: Hiroyuki Oba; Hideaki Tanaka; Tomoaki Sato; Tomohisa Hasegawa, all of Ibaraki-ken; Kazuhiko Hirose, Chiba-ken, all of Japan

[73] Assignee: Kureha Kagaku Kogyo K.K., Tokyo, Japan

[21] Appl. No.: 378,215

[22] Filed: Jan. 25, 1995

[30] Foreign Application Priority Data

Jan. 26, 1994 [JP] Japan .................. 6-023735

[51] Int. Cl.⁶ .................................. B32B 27/30
[52] U.S. Cl. .................. 428/339; 428/516; 428/518; 428/520
[58] Field of Search ...................... 428/518, 520, 428/516, 339

[56] References Cited

U.S. PATENT DOCUMENTS

| | | |
|---|---|---|
| 2,169,250 | 8/1939 | Izard . |
| 4,048,428 | 9/1977 | Baird, Jr. et al. ............... 428/518 |

FOREIGN PATENT DOCUMENTS

| | | |
|---|---|---|
| 152180 | 8/1985 | European Pat. Off. . |
| 541273 | 10/1992 | European Pat. Off. . |
| 608808 | 1/1994 | European Pat. Off. . |
| 63-47743 | 9/1988 | Japan . |
| 2-14376 | 4/1990 | Japan . |
| 2-27941 | 6/1990 | Japan . |
| 2090603 | 12/1981 | United Kingdom . |

*Primary Examiner*—P. C. Sluby
*Attorney, Agent, or Firm*—Lowe, Price, LeBlanc & Becker

[57] ABSTRACT

A gas barrier laminate having a laminated structure of at least two layers includes a gas barrier film (A) formed from a mixture containing polyvinyl alcohol and poly(meth)acrylic acid or a partially neutralized product thereof in a weight ratio ranging from 95:5 to 10:90, and having an oxygen permeability constant of $1.25 \times 10^{-3}$ ml(STP)·cm/m²·h·atm{Pa} or smaller as measured under conditions of 30° C. and 80% relative humidity, and a layer (B) formed from a thermoplastic resin. The film (A) and layer (B) are laminated contiguously to each other. A process for the production of a gas barrier laminate having a laminated structure of at least two layers comprises a step of forming a gas barrier film (A) having an oxygen permeability constant of $1.25 \times 10^{-3}$ ml(STP)·cm/m²·h·atm{Pa} or smaller as measured under conditions of 30° C. and 80% relative humidity, wherein a solution containing polyvinyl alcohol and poly(meth)acrylic acid or a partially neutralized product thereof in a weight ratio ranging from 95:5 to 10:90 is cast on a layer (B) formed from a thermoplastic resin, the solution cast is dried to form a film, and the dry film is then subjected to a heat treatment at a temperature of at least 100° C. (373 K). The gas barrier film (A) and the layer (B) are contiguous to each other.

13 Claims, 2 Drawing Sheets

GAS BARRIER LAMINATE AND PRODUCTION PROCESS THEREOF

FIELD OF THE INVENTION

The present invention relates to gas barrier laminates and a production process thereof, and more particularly to multi-layer gas barrier laminates comprising, as a gas barrier layer, a film which is formed from a mixture containing polyvinyl alcohol (PVA) and poly(meth)acrylic acid or a partially neutralized product thereof, insoluble in water and excellent in oxygen gas barrier property, and a production process thereof.

The gas barrier laminates according to the present invention are suitable for use as food packaging materials and the like because the layer of the gas barrier film contains no chlorine atom, and heat resistance, moisture resistance, mechanical strength, sealing property and the like are imparted by one or more other layers.

BACKGROUND OF THE INVENTION

In general, a function of preventing deterioration in the quality of contents is required of packaging materials. Particularly, in a field of food packaging materials and the like, in which contents are susceptible to deterioration by oxidation, the packaging materials are required to have excellent oxygen gas barrier property.

At present, for example, PVA films, films formed of a partially saponified product (EVOH) of an ethylene-vinyl acetate copolymer, polyvinylidene chloride (PVDC) films and the like are commonly used as films excellent in oxygen gas barrier property in the field of the packaging materials. Of these, the PVDC films have a feature that their gas barrier property scarcely depends on humidity unlike the PVA films and EVOH films. However, when they are incinerated, chlorine gas is generated, and so they involve an environmental problem.

The PVA films have a feature that they have good flexibility, antistatic property and oxygen gas barrier property, and moreover are best in oxygen gas barrier property among general synthetic resin films in a dry state. However, they involve a drawback that their oxygen gas barrier property is impaired to a great extent due to moisture absorption under high-humidity conditions, and moreover they are easy to dissolve in boiling water. Therefore, films enhanced in crystallinity by a heat treatment or improved in crystallinity and mechanical strength by biaxial stretching in a final stage of film processing are marketed as general-purpose PVA films. Besides, in order to lessen the dependence of the gas barrier property on humidity, some PVA films are provided in the form of a laminate film having a multi-layer structure. The PVA films according to the conventional processes are however still insufficient in the prevention of deterioration in gas barrier property due to moisture absorption and improving effect as to water resistance.

In U.S. Pat. No. 2,169,250, it has been disclosed to form films, fibers and the like from an aqueous mixture solution containing PVA and a polycarboxylic acid, and subject the formed products to a heat treatment so as to react PVA with the polycarboxylic acid, thereby introducing a cross-linked structure into the formed products to make them insoluble in water and most solvents. As a specific example thereof, it has been described to polymerize a methacrylic acid monomer in an aqueous solution of PVA, cast the resulting reaction mixture on a glass plate, dry the resulting film, and then heat the dry film for 5 minutes at 140° C., thereby obtaining a transparent crosslinked film (Example I). However, any film exhibiting excellent oxygen gas barrier property under high-humidity conditions cannot be obtained by the heat-treating conditions disclosed in this reference.

On the other hand, there have been proposed films and sheets making use of a mixture of PVA and polyacrylic acid (for example, Japanese Patent Publication No. 47743/1988, and Japanese Patent Publication Nos. 14376/1990 and 27941/1990). All these films and sheets are water-soluble or water-absorbable and not films having good water resistance and oxygen gas barrier property.

Poly(meth)acrylic acid (i.e., polyacrylic acid or polymethacrylic acid) or a partially neutralized salt thereof is a water-soluble polymer and may be formed into a film from its solution by a casting process. The resultant film is good in oxygen gas barrier property under dry conditions. However, this film is unsuitable for use as a packaging material for food or the like containing a great amount of water because it shows strong hydrophilic nature.

The present inventors repeatedly carried out an investigation with a view toward producing a film which can exhibit excellent oxygen gas barrier property inherent in a PVA film even under high-humidity conditions and moreover has excellent water resistance. As a result, it was found that when a film is formed from a mixture containing PVA and poly(meth)acrylic acid or a partially neutralized salt thereof in a specific proportion, and the resultant film is subjected to a heat treatment under specific conditions, these objects can be achieved (U.S. patent application Ser. Nos. 08/185,353 and 08/310,749). However, the simple film thus obtained is insufficient in sealing property, mechanical strength, moisture resistance, etc., which are required of packaging materials. There has thus been a demand for a further improvement.

OBJECTS AND SUMMARY OF THE INVENTION

It is an object of the present invention to provide a multi-layer gas barrier laminate comprising, as a gas barrier layer, a film having high water insolubility and exhibiting excellent oxygen gas barrier property even under high-humidity conditions, and a production process thereof.

More specifically, the object of the present invention is to provide a gas barrier laminate comprising, as a gas barrier layer, a film which is formed from a mixture containing PVA and poly(meth)acrylic acid or a partially neutralized product thereof, insoluble in water and excellent in oxygen gas barrier property, and a production process thereof.

The present inventors have carried out an extensive investigation with a view toward achieving the above object. As a result, it has been found that a multi-layer laminate having a laminated structure of at least two layers, which comprises, as a gas barrier layer, a film obtained by forming a film from a mixture containing PVA and poly(meth)acrylic acid or a partially neutralized product thereof and subjecting the resultant film to a heat treatment under specific conditions, and having high water insolubility and excellent oxygen gas barrier property, and is provided with a layer formed from a thermoplastic resin contiguously to the gas barrier layer, is fit for the above object.

When one or more films having various performance characteristics and functions such as high toughness, heat resistance, chemical resistance, oil resistance and sealing property are provided as the layer of the thermoplastic resin, a laminate combining good gas barrier property with these various properties can be obtained. In particular, the gas barrier film is lacking in sealing property. Therefore, good sealing property can be imparted thereto by laminating a thermoplastic resin having sealing property such as heat-sealing property on the gas barrier film.

Besides, when one or more other layers are laminated on these two layers to form a laminate formed of at least three layers, a multi-layer laminate more improved in heat resistance, toughness, moisture resistance, water resistance, sealing property and the like or given such properties can be obtained.

The present invention has been led to completion on the basis of these findings.

According to the present invention, there is thus provided a gas barrier laminate having a laminated structure of at least two layers, which comprises a gas barrier film (A) formed from a mixture containing polyvinyl alcohol and poly(meth)acrylic acid or a partially neutralized product thereof in a weight ratio ranging from 95:5 to 10:90, and having an oxygen permeability constant of $1.25\times10^{-3}$ ml(STP)·cm/m²·h·atm{Pa} or smaller as measured under conditions of 30° C. and 80% relative humidity, and a layer (B) formed from a thermoplastic resin, said film (A) and layer (B) being laminated contiguously to each other.

According to the present invention, there is also provided a process for the production of a gas barrier laminate having a laminated structure of at least two layers, which comprises a step of forming a gas barrier film (A) having an oxygen permeability constant of $1.25\times10^{-3}$ ml(STP)·cm/m²·h·atm{Pa} or smaller as measured under conditions of 30° C. and 80% relative humidity, wherein a solution containing polyvinyl alcohol and poly(meth)acrylic acid or a partially neutralized product thereof in a weight ratio ranging from 95:5 to 10:90 is cast on a layer (B) formed from a thermoplastic resin, the solution cast is dried to form a film, and the dry film is then subjected to a heat treatment at a temperature of at least 100° C. (373 K), said film (A) and layer (B) being contiguous to each other.

DETAILED DESCRIPTION OF THE INVENTION

Figure 1:
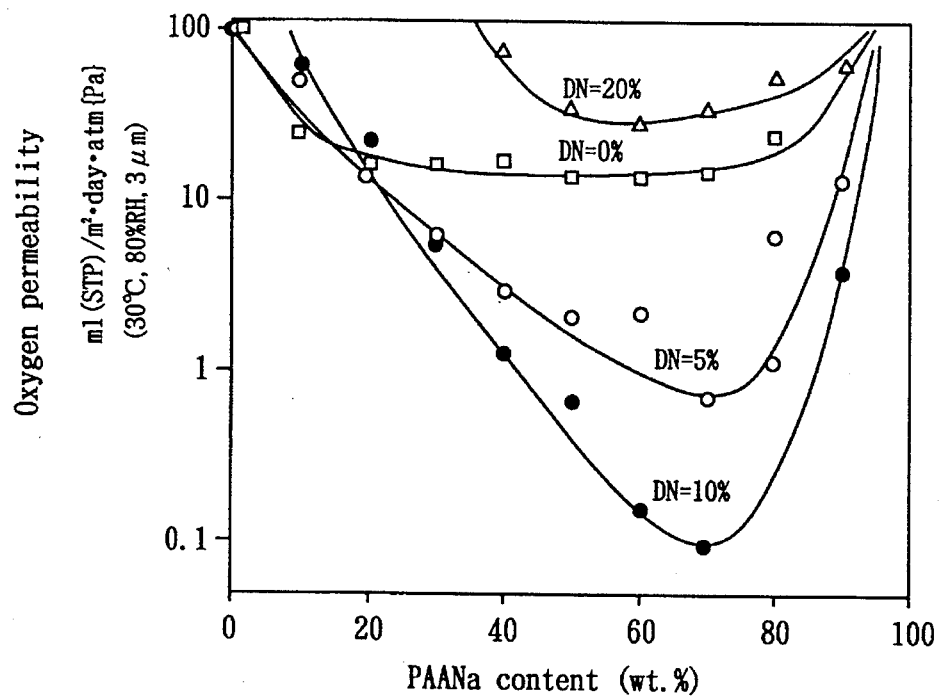
FIG. 1 is a graph showing a relationship between the content of polyacrylic acid (PAA) or a partially neutralized product (PAANa) of PAA and oxygen permeability as to heat-treated films obtained with the mixing ratio of PVA to PAA or PAANa and the degree of neutralization (DN) of PAANa separately varied.

The present invention will hereinafter be described in detail.

Gas Barrier Film

In the present invention, a gas barrier film formed from a mixture containing PVA and at least one poly(meth)acrylic acid polymer selected from the group consisting of poly(meth)acrylic acid and partially neutralized products of poly(meth)acrylic acid in a weight ratio ranging from 95:5 to 10:90, and having an oxygen permeability constant of $1.25\times10^{-3}$ ml(STP)·cm/m²·h·atm{Pa} or smaller as measured under conditions of 30° C. and 80% relative humidity (RH) is used as a gas barrier layer of the laminate.

The PVA useful in the practice of the present invention desirably has a saponification degree of generally at least 95%, preferably at least 98%, and an average polymerization degree of generally 300–2,500, preferably 300–1,500.

The poly(meth)acrylic acid useful in the practice of the present invention is a compound having at least two carboxylic groups in its molecule. Specific examples thereof include polyacrylic acid, polymethacrylic acid, copolymers of acrylic acid and methacrylic acid, and mixtures of at least two polymers thereof. As preferable examples thereof, may be mentioned homopolymers of acrylic acid or methacrylic acid., and copolymers thereof. The number average molecular weight of the poly(meth)acrylic acid preferably falls within a range of from 2,000 to 250,000.

The partially neutralized product of the poly(meth)acrylic acid useful in the practice of the present invention can be obtained by partially neutralizing the carboxyl groups of the above-described poly(meth)acrylic acid with an alkali (namely, forming a carboxylate). As examples of the alkali, may be mentioned sodium hydroxide, lithium hydroxide, potassium hydroxide, ammonia (including aqueous ammonia), etc. The partially neutralized product is generally prepared by adding the alkali to an aqueous solution of the poly(meth)acrylic acid. The desired degree of neutralization can be achieved by controlling the quantitative ratio of the poly(meth)acrylic acid to the alkali. When the partially neutralized product of the poly(meth)acrylic acid is used, coloring of the resulting film due to the heat treatment can be reduced to a significant extent compared with the case making use of the poly(meth)acrylic acid. In addition, the gas barrier property can be more improved by suitably selecting the degree of neutralization. However, the gas barrier property shows a tendency to deteriorate when the degree of neutralization exceeds 20%. Therefore, the degree of neutralization of the partially neutralized product of the poly(meth)acrylic acid is preferably 20% or lower, more preferably 1–20%, most preferably 3–15%.

Incidentally, the degree of neutralization is determined by the following equation:

$$Degree\ of\ neutralization = (X/Y)\times 100\ [\%]$$

wherein X means the number of moles of carboxyl groups neutralized in 1 g of the partially neutralized poly(meth)acrylic acid, and Y denotes the number of moles of carboxyl groups in 1 g of the poly(meth)acrylic acid before the partial neutralization.

A mixed system of the PVA having a high saponification degree and the poly(meth)acrylic acid or the partially neutralized product thereof is excellent in compatibility, and can provide an intimate mixture solution, for example, when dissolved in water. Processes for forming a film from a mixture of these components include a process (solvent casting) in which an aqueous solution of the mixture is cast (coated) on a support such as a glass plate or plastic film, and the mixture is dried to form a film, a process (extrusion) in which a liquid with the mixture dissolved in water in a high concentration is cast (coated) on a rotating drum or belt in the form of a film by an extruder through a thin slit while applying a discharge pressure, and the resulting water-containing film is dried on the rotating drum or belt, and the like. Of these film-forming processes, the solvent casting process is particularly preferred because a dry film excellent in transparency can be obtained with ease.

The mixture of the PVA and the poly(meth)acrylic acid or the partially neutralized product thereof can be prepared by a method in which the respective polymers are dissolved in water, a method in which aqueous solutions of the respective polymers are mixed with each other, a method in which a (meth)acrylic acid monomer is polymerized in an aqueous solution of the PVA, a method in which a (meth)acrylic acid monomer is polymerized in an aqueous solution of the PVA, and the resulting polymer is then neutralized with an alkali, or the like. The mixture may be prepared by using solvents other than water. In the case where the solvent casting process is used, the concentration of the polymer mixture is generally adjusted to about 5–30 wt. %. When the aqueous solution or the liquid with the mixture dissolved in water in a high concentration is prepared, solvents other than water, such as alcohol, flexibilizers, and the like may suitably be added if desired. No particular limitation is imposed on the thickness of the film, and it may hence be suitably determined as necessary for the end application intended. However, it may be generally of the order of 0.1–500 µm, preferably 0.5–100 µm, more preferably 0.5–50 µm.

The mixing ratio by weight of the PVA to the poly(meth)acrylic acid or the partially neutralized product thereof must be controlled to 95:5 to 10:90 from the viewpoint of the improvement in gas barrier property under high-humidity conditions. If the mixing ratio is outside the above range, any film exhibiting good gas barrier property under high-humidity conditions compared with a film formed of PVA alone cannot be provided. The mixing ratio may preferably be 90:10 to 10:90, more preferably from 80:20 to 20:80.

In order to form a film having excellent water resistance and gas barrier property from a mixture of the PVA and the poly(meth)acrylic acid or the partially neutralized product thereof, it is necessary to conduct a heat treatment under specific conditions after the formation of a film from the mixture by the solvent casting process or the like. With respect to a film formed of the PVA alone and the film formed of the mixture, heat treatment was conducted with temperature and time varied after the formation of their films. As a result, in the case of the film (thickness: 3 µm) formed of the PVA alone, it was found that its oxygen permeability at 30° C. and 80% RH is decreased to about 100 ml(STP)/m²·day·atm{Pa} by the heat treatment. This oxygen permeability corresponds to an oxygen permeability constant of $1.25 \times 10^{-3}$ ml(STP)·cm/m²·h·atm{Pa}.

When the film formed of the mixture of the PVA and the poly(meth)acrylic acid or the partially neutralized product thereof is heat-treated, the film may be provided as a film having gas barrier property superior to that of the film formed of the PVA alone. Heat-treating conditions for that were found to be as follows.

In the case where the PVA and the poly(meth)acrylic acid are used as starting materials for the gas barrier film, the gas barrier film can be provided as a film having an oxygen permeability constant of $1.25 \times 10^{-3}$ ml(STP)·cm/m²·h·atm{Pa} or smaller as measured under conditions of 30° C. and 80% RH when a film formed is heat-treated in a dry heat atmosphere, such as in an oven, under conditions satisfying the following relationships (a) and (b):

(a) $373 \leq T \leq 573$ (b) $\log t \geq -0.0282 \times T + 14.14$ wherein T denotes a heat-treating temperature (K) and t means heat-treating time (min).

In order to obtain a gas barrier film formed of the mixture of the PVA and the poly(meth)acrylic acid and having an oxygen permeability of 50 ml(STP)/m²·day·atm{Pa} or lower as measured under conditions of 30° C. and 80% RH (film thickness: 3 µm), it is only necessary to conduct the heat treatment under conditions satisfying the following relationship (c) in place of those satisfying the relationship (b):

(c) $\log t \geq -0.0278 \times T + 14.14$.

The use of the heat-treating conditions satisfying the relationships (a) and (c) permits the provision of a gas barrier film having an oxygen permeability constant of $6.25 \times 10^{-4}$ ml(STP)·cm/m²·h·atm{Pa} or smaller as measured under conditions of 30° C. and 80% RH.

In the case where the PVA and the partially neutralized product of the poly(meth)acrylic acid are used as starting materials for the gas barrier film, the gas barrier film can be provided as a film having an oxygen permeability constant of $1.25 \times 10^{-3}$ ml(STP)·cm/m²·h·atm{Pa} or smaller as measured under conditions of 30° C. and 80% RH when a film formed is heat-treated under conditions satisfying the following relationships (a) and (d):

(a) $373 \leq T \leq 573$ (d) $\log t \geq -0.0582 \times T + 26.06$ wherein T denotes a heat-treating temperature (K) and t means heat-treating time (min).

In order to obtain a gas barrier film formed of the mixture of the PVA and the partially neutralized product of the poly(meth)acrylic acid and having an oxygen permeability of 50 ml(STP)/m²·day·atm{Pa} or lower as measured under conditions of 30° C. and 80% RH (film thickness: 3 µm), it is only necessary to conduct the heat treatment under conditions satisfying the following relationship (e) in place of those satisfying the relationship (d):

(e) $\log t \geq -0.0564 \times T + 25.53$.

The use of the heat-treating conditions satisfying the relationships (a) and (e) permits the provision of a gas barrier film having an oxygen permeability constant of $6.25 \times 10^{-4}$ ml(STP)·cm/m²·h·atm{Pa} or smaller as measured under conditions of 30° C. and 80% RH.

In each case, the heat-treating temperature is selected from a range of from 373 K (100° C.) to 573 K (300° C.). However, it takes very long heat-treating time for achieving the desired gas barrier property if the heat-treating temperature falls within a lower temperature range, resulting in reduction of productivity. For example, in order to obtain a gas barrier film formed of the mixture and having an oxygen permeability of 100 ml(STP)/m²·day·atm{Pa} or lower as measured under conditions of 30° C. and 80% RH (film thickness: 3 µm), a heating temperature of 120° C. requires heat-treating time as long as at least 30 hours. On the other hand, a film having high gas barrier property can be obtained in shorter heat-treating time as the heat-treating temperature becomes high. However, if the temperature is too high, there is a possibility that discoloration and/or decomposition may occur on the film. Accordingly, it is preferable to conduct the heat treatment within a range of from 433 K (160° C.) to 503 K (230° C.) or so.

Besides a dry heat atmosphere such as in an oven, a method in which a film is brought into contact with a heating member, for example, a heated roll or the like may also be used as heat-treating means. In the case of this method, the heat-treating time can be shortened. For example, when a dry film is brought into contact with a heated roll controlled at 433–523 K (160°–250° C.) for 180–3 seconds, a gas barrier film having the desired water resistance and gas barrier property can be obtained.

Such a heat treatment can provide a gas barrier film formed from the mixture of the PVA and the poly-(meth)acrylic acid or the partially neutralized product thereof, and having excellent gas barrier property as demonstrated by an oxygen permeability constant of $1.25 \times 10^{-3}$ ml(STP)·cm/m$^2$·h·atm{Pa} or smaller as measured under conditions of 30° C. and 80% RH. This gas barrier property is identical to or better than that of a heat-treated film formed of the PVA alone. In addition, the heat treatment can impart water resistance to the film formed from the mixture, and such a film is hence insoluble even in boiling water.

Gas Barrier Laminate

The gas barrier laminates according to the present invention have a laminated structure of at least two layers, in which the above-described gas barrier film (A) formed from the mixture of the PVA and the poly(meth)acrylic acid or the partially neutralized product thereof is laminated contiguously to a layer (B) formed from a thermoplastic resin.

No particular limitation is imposed on the thermoplastic resin to be used. As examples thereof, may be mentioned polyesters such as polyethylene terephthalate (PET), polyamides such as nylon 6, nylon 66, nylon 12, nylon 6•66 copolymers and nylon 6•12 copolymers; polyolefins such as low-density polyethylene, high-density polyethylene, linear low-density polyethylene, ethylene-vinyl acetate copolymers, polypropylene, ethylene-acrylic acid copolymers, ethylene-acrylic acid salt copolymers and ethylene-ethyl acrylate copolymers; polyvinyl chloride; polyvinylidene chloride; and polyphenylene sulfide.

The lamination of the layer (B) of these various thermoplastic resins on the gas barrier film (A) can provide a gas barrier laminate combining excellent gas barrier properties with various performance characteristics and functions, for example, high heat resistance, chemical resistance, oil resistance, mechanical strength, sealing property, weathering resistance and moisture resistance, protection of the gas barrier film, and good machinability in secondary processing. For example, when the gas barrier film is laminated on a film formed of a thermoplastic resin having good heat-sealing property, such as a polyolefin, a laminate combining high gas barrier property with good heat-sealing property can be obtained. Besides, when laminated on a heat-resistant film, a laminate to which high heat resistance and toughness, and the like are imparted can be obtained.

The lamination of the gas barrier film (A) with the layer (B) formed from the thermoplastic resin can be performed through an adhesive layer or without need of any adhesive layer by any known laminating process such as a coating process, dry lamination process or extrusion-coating process. In the coating process (including casting process), a mixture solution of the PVA and the poly(meth)acrylic acid or the partially neutralized product thereof is coated on a layer of the thermoplastic resin to a predetermined thickness by means of, for example, an air-knife coater, kiss-roll coater, metering bar coater, gravure-roll coater, reverse-roll coater, dip coater or die coater, or a combination thereof. Water in the solution thus coated is then evaporated by blowing of heated air, infrared irradiation or the like using an arch dryer, straight bath dryer, tower dryer or drum dryer, or a combination thereof, thereby forming a film. Thereafter, the film is heat-treated.

In the dry lamination process, the gas barrier film and a film or sheet formed from the thermoplastic resin are laminated on each other. In the extrusion-coating process, the thermoplastic resin is melt-extruded on the gas barrier film to form a layer.

In view of the fact that the layer of the gas barrier film (A) is generally formed by casting a solution of the mixture on a support by the solvent casting process, drying the solution to form a film and then heat-treating the dry film at a high temperature, and the simple gas barrier film (A) is insufficient in toughness, it is preferable to use a heat-resistant film such as a stretched PET film, stretched nylon film or stretched polypropylene film as a support, and form the gas barrier film (A) on the support by the solvent casting process and the subsequent heat treatment. Among heat-resistant films, heat-resistant films formed from a thermoplastic resin such as PET or nylon 6, the melting point or Vicat softening point of which is at least 180° C., are particularly preferred because they are good in dimensional stability and permit the provision of laminates with the gas barrier film (A) closely bonded to the heat-resistant film.

Incidentally, the melting-point and Vicat softening point can be measured in accordance with JIS K-7121 and JIS K-7206, respectively.

The laminates according to the present invention are not limited to those having a two-layer structure of the gas barrier film (A) and the thermoplastic resin layer (B), and one or more other layers may hence be laminated. As examples thereof, may be mentioned glass sheets and plastic sheets. Besides, the gas barrier film (A) can be sandwiched between thermoplastic resin layers identical to or different from each other to obtain a laminate improved in dependence of the gas barrier property on humidity, mechanical strength, water resistance and the like. In addition, various films and coating layers may be provided to impart functions such as gloss, fog resistance and ultraviolet barrier property to the laminate.

If a heat-resistant film in the laminate of the gas barrier film and the heat-resistant film is insufficient in sealing property, an additional layer of a thermoplastic resin having good sealing property may be laminated on the laminate to impart the good sealing property to the laminate. Sealing methods of packaging materials generally include heat sealing, impulse heat sealing, high-frequency sealing, ultrasonic sealing and the like. Therefore, the sealing layer may desirably be formed from a thermoplastic resin fit for the sealing method used.

In packaging materials, the heat sealing is generally used. Examples of the sealing layer capable of heat-sealing include layers formed from polyolefins such as low-density polyethylene, linear low-density polyethylene, high-density polyethylene, ethylene-vinyl acetate copolymers, polypropylene, ethylene-acrylic acid copolymers, ethylene-acrylic acid salt copolymers and ethylene-ethyl acrylate copolymers, nylon copolymers such as nylon 6•66 copolymers and nylon 6•12 copolymers, etc.

As the sealing method, the high-frequency sealing may also be often used. Examples of the sealing layer capable of high-frequency-sealing include layers formed from polyvinyl chloride, polyvinylidene chloride, nylon 6 and nylon 66.

The thermoplastic resin having sealing property may be suitably selected as necessary for the end application intended. It is however preferable to use a thermoplastic resin having a melting point or Vicat softening point lower than 180° C. in that a laminate having sealing strength of at least 2 kg·f (15 mm wide) is generally easy to be obtained.

In the case where a sealing layer is additionally laminated on the laminate of the gas barrier film and the heat-resistant film, the sealing layer is laminated contiguously to either the gas barrier film or the heat-resistant film through an adhesive layer or without need of any adhesive layer. A further layer may be laminated on the side not laminated with the sealing layer if desired.

If the adhesion between the individual layers is insufficient, an adhesive layer may be provided therebetween. As adhesives used for it, may be mentioned various kinds of adhesives such as urethane-based, acrylic-based and polyester-based adhesives, which are commonly used for dry lamination and the like of various films.

Various kinds of additives such as an antioxidant, lubricant, ultraviolet absorbent, pigment, filler and antistatic agent may be added to the individual layers according to the present invention if desired.

In the laminates according to the present invention, the thickness of the gas barrier film (A) is as described above. No particular limitation is imposed on the thickness of the layer (B) formed from the thermoplastic resin. However, it is generally 5–1,000 µm, preferably . 10–100 µm from the viewpoint of mechanical strength, flexibility, economy and the like. In the case where the layer (B) formed from the thermoplastic resin serves as the sealing layer, or where a sealing layer is provided separately from the layer .(B) formed from the thermoplastic resin, no particular limitation is imposed on the thickness of the sealing layer. However, it is generally 5–1,000 µm, preferably 10–100 µm from the viewpoint of sealing strength, flexibility, economy and the like.

The laminated structures of the laminates according to the present invention are as described above. As typical structures thereof, may be mentioned (1) gas barrier film/thermoplastic resin layer, (2) heat-resistant film/gas barrier film/sealing layer and (3) sealing layer/heat-resistant film/gas barrier film. However, the laminates are not limited to these structures only.

The production process of the laminates according to the present invention is as already described. As a particularly preferred embodiment, however, may be mentioned a process for the production of a gas barrier laminate having a laminated structure of at least two layers, which comprises a step of forming a gas barrier film (A) having an oxygen permeability constant of $1.25 \times 10^{-3}$ ml(STP)·cm/m$^2$·h·atm{Pa} or smaller as measured under conditions of 30° C. and 80% relative humidity, wherein a solution containing polyvinyl alcohol and poly(meth)acrylic acid or a partially neutralized product thereof in a weight ratio ranging from 95:5 to 10:90 is cast on a layer (B) formed from a thermoplastic resin, the solution cast is dried to form a film, and the dry film is then subjected to a heat treatment at a temperature of at least 100° C. (373 K), said film (A) and layer (B) being contiguous to each other.

The heat-treating conditions are as described above. It is also preferable to use the heat-resistant film as the layer (B) formed from the thermoplastic resin for the purpose of rapidly conducting the heat treatment. If the layer (B) formed from the thermoplastic resin is lacking or insufficient in sealing property, a layer having good sealing property may be additionally laminated on the thus-obtained laminate composed of the gas barrier film (A) and the layer (B) formed from the thermoplastic resin, thereby producing a laminate having a three-layer structure. The sealing layer is laminated contiguously to either the gas barrier film (A) or the layer (B) through an adhesive layer or without need of any adhesive layer by the dry lamination process or the like. It goes without saying that one or more other layers may be laminated together with the sealing layer or in place of the sealing layer.

ADVANTAGES OF THE INVENTION

According to the present invention, there are provided gas barrier laminates comprising, as a gas barrier layer, a film insoluble in water and excellent in oxygen gas barrier property even under high-humidity conditions, and a production process thereof. The gas barrier film useful in the practice of the present invention has gas barrier property identical to or better than that of a PVA film and is low in dependence of the gas barrier property on humidity and good in water resistance. The laminates comprising this gas barrier film combine the gas barrier property with good sealing property and high toughness and are suitable for use as packaging materials for goods and products liable to be deteriorated by oxygen gas, for example, meat products such as meat, hams and sausages, drinks such as juices and soda pop, medical products such as infusions, etc.

EMBODIMENTS OF THE INVENTION

The present invention will hereinafter be described more specifically by the following referential examples, examples and comparative examples. It should however be borne in mind that the present invention is not limited to these examples only.

REFERENTIAL EXAMPLE 1

In this Referential Example 1, the influence of the mixing ratio of PVA to poly(meth)acrylic acid or a partially neutralized product thereof on the gas barrier property of heat-treated films will be described.

Poval 105 (product of Kuraray Co., Ltd.; saponification degree: 98.5%; average polymerization degree: 500) and a 25 wt. % aqueous solution of polyacrylic acid (product of Wako Pure Chemical Industries, Ltd., number average molecular weight: 150,000) were used as PVA and polyacrylic acid (PAA), respectively. Calculated amounts of sodium hydroxide were separately added to portions of the aqueous solution of PAA to prepare partially neutralized products (PAANa) of PAA having degrees of neutralization (DN) of 5%, 10% and 20%, respectively.

PVA and PAA or PAANa were mixed to give various weight ratios shown in Table 1 to prepare aqueous solutions (polymer concentration: 10 wt. %). These aqueous solutions were separately coated on stretched polyethylene terephthalate films (stretched PET films 16 µm thick; melting point: 264° C.) by a Meyer bar using a bench coater (K303 PROOFER, manufactured by RK Print-Coat Instruments, Ltd.), and water was then evaporated by a dryer, thereby obtaining dry films 3 µm thick. The stretched PET films on which these dry films had been respectively formed were subjected to a heat treatment at 200° C. for 15 minutes in an oven. Oxygen permeabilities measured under conditions of 30° C. and 80% RH on the heat-treated films thus obtained are shown in Table 1. The results shown in Table 1 are also graphically illustrated in FIG. 1.

<Measuring method of oxygen permeability>

The oxygen permeability of each of the heat-treated films was determined by separately measuring oxygen permeabilities of the stretched PET film and the stretched PET film, on which the heat-treated film had been formed, by means of oxygen permeability testers, OX-TRAN 2/20 and 100TWIN, both, manufactured by Modern Control Company, and calculating the oxygen permeability, $P_{film}$ of the heat-treated film in accordance with the following equation:

$$1/P_{total}=1/P_{film}+1/P_{PET}$$

wherein $P_{total}$: oxygen permeability of the stretched PET film on which the heat-treated film had been laminated;

$P_{film}$: oxygen permeability of the heat-treated film; and $P_{PET}$: oxygen permeability of the stretched PET film.

TABLE 1

| Composition (wt. %) | | Oxygen permeability (30° C., 80% RH, 3 μm) ml (STP)/m² · day · atm{Pa} | | | |
|---|---|---|---|---|---|
| PVA | PAANa | DN = 0% | DN = 5% | DN = 10% | DN = 20% |
| 100 | 0 | 100 | 100 | 100 | 100 |
| 90 | 10 | 39 | 49 | 64 | 180 |
| 80 | 20 | 19 | 14 | 22 | 120 |
| 70 | 30 | 19 | 6.6 | 5.5 | 120 |
| 60 | 40 | 21 | 3.0 | 1.3 | 79 |
| 50 | 50 | 16 | 2.2 | 0.7 | 40 |
| 40 | 60 | 16 | 2.5 | 0.3 | 28 |
| 30 | 70 | 17 | 0.7 | 0.1 | 35 |
| 20 | 80 | 35 | 1.2 | 0.5 | 53 |
| 10 | 90 | 1350 | 14 | 4.0 | 64 |
| 0 | 100 | >5000 | >5000 | >5000 | >5000 |

As apparent from Table 1, it is understood that films exhibiting excellent gas barrier property even under high-humidity conditions of 30° C. and 80% RH can be obtained in the case where a mixing ratio by weight of PVA:PAA (DN=0%) or PVA:PAANa (DN=5%, 10% or 20%) is 95:5 to 10:90,, preferably 90:10 to 10:90, more preferably 80:20 to 20:80. Although the gas barrier property is improved by partially neutralizing PAA (to DN=5% or 10%), it shows a tendency to reduce as the degree of neutralization increases (DN=20%). Therefore, the degree of neutralization is preferably controlled to 20% or lower. The film formed of the PVA alone, and the films obtained by singly using PAANas which varied in degree of neutralization were soluble in boiling water. All the heat-treated films other than these films were however insoluble in boiling water. More specifically, these heat-treated films were immersed for 10 minutes in boiling water (95° C.), but were insoluble therein.

REFERENTIAL EXAMPLE 2

In this Referential Example 2, the influence of heat-treating conditions (heat-treating temperature and heat-treating time) on the gas barrier property of heat-treated films formed from a mixture of PVA and PAA will be described.

A dry film 3 μm thick, which had a composition of PVA:PAA=60:40 by weight, was formed on a stretched PET film in the same manner as in Referential Example 1. Portions of the stretched PET film on which this dry film had been formed were separately subjected to a heat treatment in an oven with heat-treating temperature and heat-treating time varied as shown in Table 2. The oxygen permeability of each of the heat-treated films thus obtained was measured at 30° C. and 80% RH by the same method as in Referential Example 1. The results are shown in Table 2.

TABLE 2

| Heat-treating conditions | | Oxygen permeability ml (STP)/m² · day · atm{Pa} |
|---|---|---|
| Temperature | Time | (30° C., 80% RH, 3 μm) |
| 120° C. | 2 hours | N.D.* |
| | 4 hours | N.D.* |
| | 8 hours | 1010 |
| | 16 hours | 280 |
| | 31 hours | 100 |
| 140° C. | 1 hour | 1570 |
| | 2 hours | 430 |
| | 4 hours | 110 |
| | 8 hours | 35 |
| | 16 hours | 14 |
| 160° C. | 30 minutes | 330 |
| | 1 hour | 52 |
| | 2 hours | 22 |
| | 4 hours | 9 |
| 180° C. | 15 minutes | 270 |
| | 30 minutes | 54 |
| | 1 hour | 14 |
| | 2 hours | 6 |
| 200° C. | 3 minutes | 1200 |
| | 5 minutes | 260 |
| | 10 minutes | 55 |
| | 15 minutes | 21 |
| 230° C. | 3 minutes | 33 |
| | 5 minutes | 14 |
| | 10 minutes | 8 |

*N.D. means that the measurement was impossible because the oxygen permeability of the stretched PET film as a support was close to the oxygen permeability of the stretched PET film on which the film had been laminated.

Figure 2:
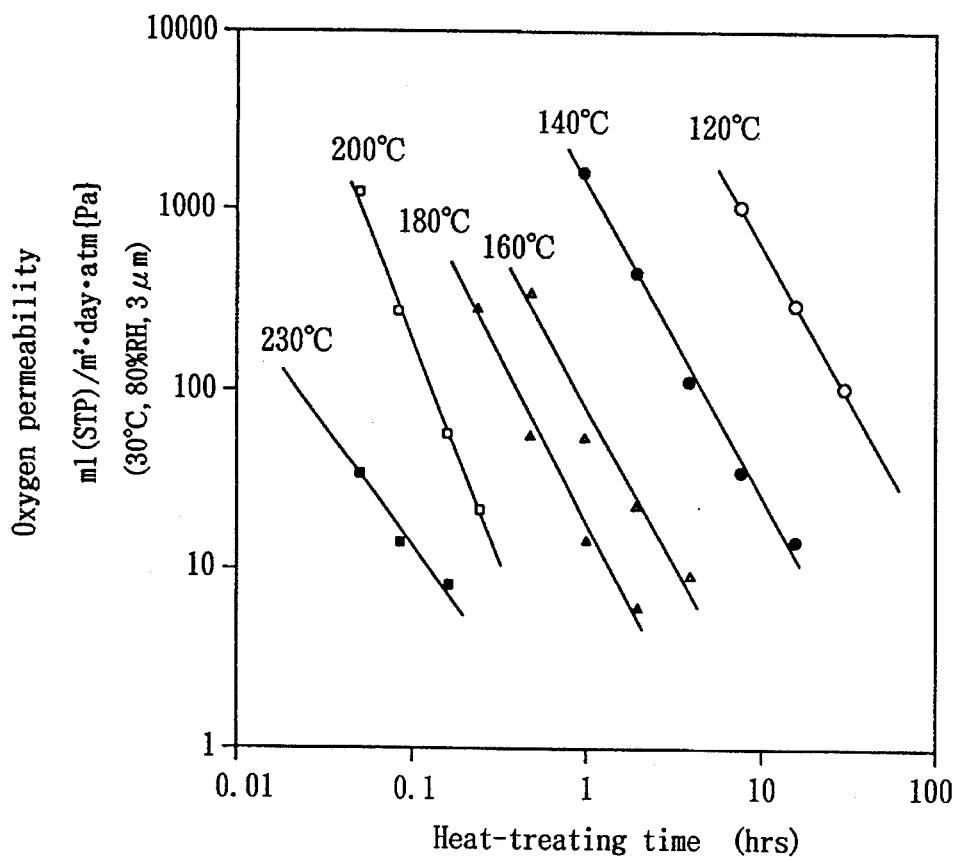
FIG. 2 is a graph showing a relationship between heat-treating conditions (temperature and time) and oxygen permeability as to heat-treated films formed from a mixture of PVA and PAA.

With respect to the data in Table 2, the relationship between the heat-treating time and the oxygen permeability in each of the heat-treating temperatures is graphically illustrated in FIG. 2. More specifically, with respect to the relationship between oxygen permeability (P) and heat-treating time (t), a linear regression line between log P and log t was prepared in each heat-treating temperature from the data shown in Table 2 in accordance with a method known per se in the art.

In each heat-treating temperature, heat-treating time, log t for which the oxygen permeability came to 0.1, 1.0, 5.0, 10, 50, 100, 500 or 1000 ml(STP)/m²·day·atm{Pa} was then calculated out. Further, a linear regression line as to the relationship between the heat-treating temperature (T) and log t was prepared on the basis of this calculated result. A heat-treated film formed of the PVA alone and having a thickness of 3 μm has an oxygen permeability of 100 ml(STP)/m²·day·atm{Pa} or so. In order to obtain a film formed of the mixture and having gas barrier property superior to that of the simple PVA film, accordingly, it is necessary to conduct the heat treatment under heat-treating conditions that the oxygen permeability came to 100 ml(STP)/m²·day·atm{Pa} or lower. From the results of the regression analysis obtained above, such heat-treating conditions were found to be satisfied by the following relationship:

$$\log t \geq -0.0282 \times T + 14.14.$$

wherein T denotes a heat-treating temperature (K) and t means heat-treating time (min).

REFERENTIAL EXAMPLE 3

In this Referential Example 3, the influence of heat-treating conditions (heat-treating temperature and heat-treating time) on the gas barrier property of heat-treated films formed from a mixture of PVA and PAANa will be described.

A dry film 3 μm thick, which had a composition of PVA:PAANa (DN=10%)=30:70 by weight, was formed on a stretched PET film in the same manner as in Referential Example 1. Portions of the stretched PET film on which this dry film had been formed were separately subjected to a heat treatment in an oven with heat-treating temperature and heat-treating time varied as shown in Table 3. The oxygen permeability of each of the heat-treated films thus obtained was measured at 30° C. and 80% RH by the same method as in Referential Example 1. The results are shown in Table 3.

TABLE 3

| Heat-treating conditions | | Oxygen permeability ml (STP)/m² · day · atm{Pa} |
|---|---|---|
| Temperature | Time | (30° C., 80% RH, 3 μm) |
| 120° C. | 2 hours | N.D.* |
|  | 4 hours | N.D.* |
|  | 8 hours | 1000 |
|  | 16 hours | 400 |
|  | 32 hours | 54 |
| 140° C. | 1 hour | 430 |
|  | 2 hours | 190 |
|  | 4 hours | 40 |
|  | 8 hours | 11 |
|  | 16 hours | 3.3 |
| 160° C. | 30 minutes | 7.4 |
|  | 1 hour | 3.2 |
|  | 2 hours | 0.83 |
|  | 4 hours | 0.44 |
| 180° C. | 15 minutes | 2.9 |
|  | 30 minutes | 0.44 |
|  | 1 hour | 0.38 |
|  | 2 hours | 0.17 |
| 200° C. | 10 minutes | 0.4 |
|  | 15 minutes | 0.1 |

*N.D. has the same meaning as described above.

Figure 3:
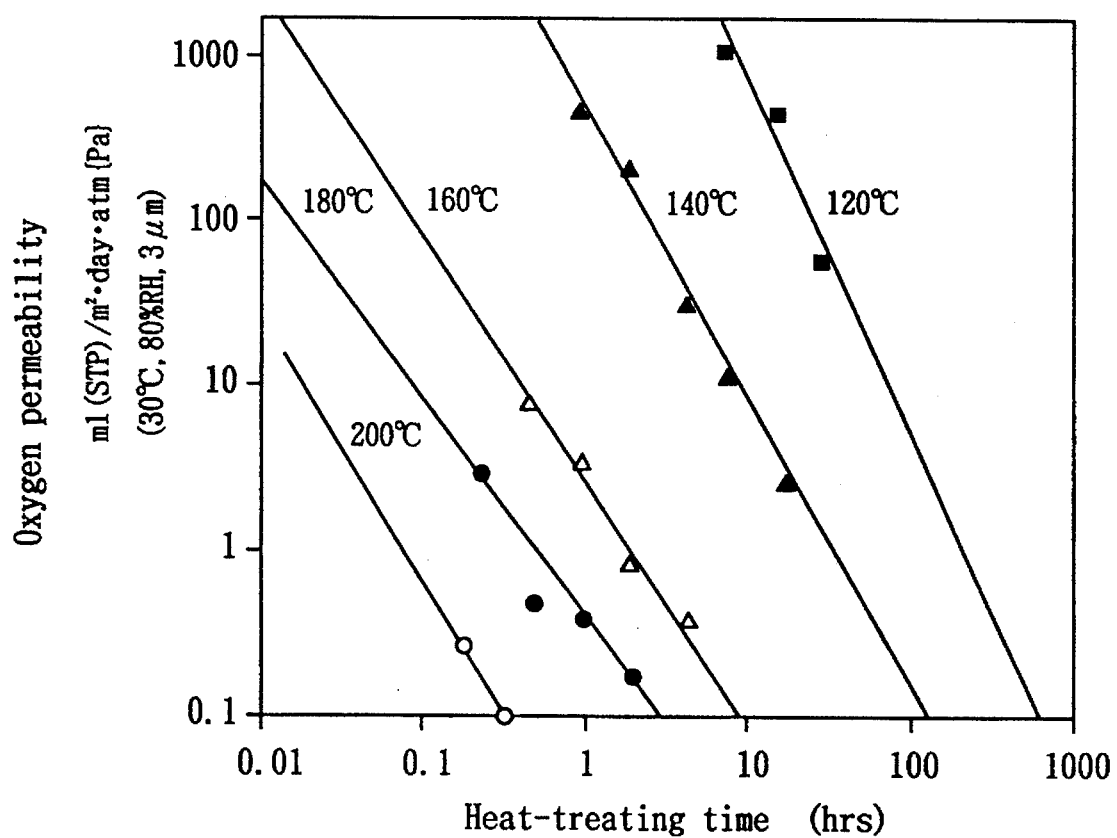
FIG. 3 is a graph showing a relationship between heat-treating conditions (temperature and time) and oxygen permeability as to heat-treated films formed from a mixture of PVA and PAANa.

With respect to the data in Table 3, the relationship between the heat-treating time and the oxygen permeability in each of the heat-treating temperatures is graphically illustrated in FIG. 3. More specifically, with respect to the relationship between oxygen permeability (P) and heat-treating time (t), a linear regression line between log P and log t was prepared in each heat-treating temperature from the data shown in Table 3 in accordance with a method known per se in the art.

In each heat-treating temperature, heat-treating time, log t for which the oxygen permeability came to 0.1, 1.0, 5.0, 10, 50, 100, 500 or 1000 ml(STP)/m²·day·atm{Pa} was then calculated out. Further, a linear regression line as to the relationship between the heat-treating temperature (T) and log t was prepared on the basis of this calculated result. From the results of the regression analysis obtained above, heat-treating conditions under which the oxygen permeability of the heat-treated film came to 100 ml(STP)/m²·day·atm{Pa} or lower were found to be satisfied by the following relationship:

$$\log T \geq -0.0582 \times T + 26.06.$$

wherein T denotes a heat-treating temperature (K) and t means heat-treating time (min).

EXAMPLES 1–9 AND COMPARATIVE EXAMPLES 1–2

Poval 105 (product of Kuraray Co., Ltd.; saponification degree: 98.5%; average polymerization degree: 500) and a 25 wt. % aqueous solution of polyacrylic acid (product of Wako Pure Chemical Industries, Ltd., number average molecular weight: 150,000) were used as PVA and polyacrylic acid (PAA), respectively.

PAA was partially neutralized with sodium hydroxide (NaOH) to a degree of neutralization of 10% to prepare a partially neutralized product (PAANa, DN=10%). An aqueous solution (polymer concentration: 10wt. %) of a mixture containing PVA and PAANa in a weight ratio of 30:70 was then prepared. This aqueous solution was coated by a Meyer bar on a stretched PET film (melting point: 264° C.) or a stretched nylon 6 (ONy) film (melting point: 220° C.), and water was then evaporated by a dryer, thereby obtaining dry films 3 μm thick. The stretched PET film and ONy film on which these dry films had been respectively formed were subjected to a heat treatment in an oven. Besides, an aqueous solution of a mixture containing PVA and PAA in a weight ratio of 50:50 was prepared, and a dry film was formed on a stretched PET film in the same manner as described above, and then subjected to a heat treatment.

Further, a 20 wt. % aqueous solution of polymethacrylic acid (AC-30H, product of NIHON JUNYAKU Co., Ltd., number average molecular weight: 50,000) was used as polymethacrylic acid (PMAA) to prepare a partially neutralized product (PMAANa) having a degree of neutralization of 10% with NaOH An aqueous solution (polymer concentration: 10 wt. %) of a mixture containing PVA and PMAANa in a weight ratio of 80:20 was then prepared. This aqueous solution was coated by a Meyer bar on an ONy film, and water was then evaporated by a dryer, thereby obtaining a dry film 3 μm thick. The ONy film on which the dry film had been formed was subjected to a heat treatment.

A linear low-density polyethylene (LLDPE) film (melting point: 121° C.) or an unstretched polypropylene (CPP) film (melting point: 165° C.) were separately dry-laminated through a layer of an adhesive (Adcoat 335A, product of Toyo Morton K.K.; hardener: CAT-10) on some of the thus-obtained laminates having a two-layer structure. For the sake of comparison, the aqueous solution of the mixture of PVA and PAANa was cast on a glass plate to form a dry film. The dry film was then subjected to a heat treatment and then peeled from the glass plate, thereby producing a simple heat-treated film.

The laminated structures, heat-treating conditions, oxygen permeabilities measured under conditions of 30° C. and 80% RH, oxygen permeabilities after a Gerbo test and sealing strength of the laminates thus obtained are shown in Table 4.

<Sealing strength>

Each sample was heat-sealed by means of a deaerating sealer, V-300 (manufactured by Fuji Impulse K.K.). A sealing surface was formed by the third layer (Examples 1–5), the first layer (Examples 6–9) or the second layer (Comparative Example 2). The sealing strength was determined by measuring the tensile strength of a piece of film cut out into a width of 15 mm by means of a Tensilon RTM100 manufactured by Toyo Baldwin K.K. The pulling rate was 500 mm/min.

<Resistance to flexural fatigue: oxygen permeability after Gerbo test>

A sample piece was flexed 10 times at 25° C. and 50% RH by means of a Gerbo flex tester manufactured by Rigaku Kogyo K.K., and its oxygen permeability was then measured.

TABLE 4

| | Laminated structure | | | Heat treatment | | Oxygen permeability[*1] | | Sealing[*2] strength |
|---|---|---|---|---|---|---|---|---|
| | First layer (μm) | Second layer (μm) | Third layer (μm) | Temp. (°C.) | Time (min) | Laminated film | After Gerbo test | |
| Ex. 1 | PET (12) | PVA + PAANa (3) | LLDPE (50) | 200 | 15 | 0.1 | 0.5 | 4.3 |
| Ex. 2 | PET (12) | PVA + PAANa (3) | CPP (50) | 200 | 15 | 0.1 | 0.5 | 3.0 |
| Ex. 3 | PET (12) | PVA + PAANa (3) | LLDPE (50) | 180 | 15 | 2.8 | 5 | 4.3 |
| Ex. 4 | PET (12) | PVA + PAANa (3) | LLDPE (50) | 160 | 30 | 7.0 | 10 | 4.3 |
| Ex. 5 | PET (12) | PVA + PAA (3) | CPP (50) | 200 | 15 | 13 | 25 | 3.0 |
| Ex. 6 | PET (12) | PVA + PAANa (3) | — | 200 | 15 | 0.1 | 1.5 | 0.4 |
| Ex. 7 | PET (25) | PVA + PAANa (3) | — | 200 | 15 | 0.1 | 0.8 | 1.4 |
| Ex. 8 | ONy (15) | PVA + PAANa (3) | — | 160 | 30 | 6.6 | 9.7 | 0.6 |
| Ex. 9 | ONy (15) | PVA + PMAANa (3) | — | 200 | 15 | 17 | 30 | 0.6 |
| Comp. Ex. 1 | PET (12) | — | — | Subjected to no heat treatment | | 140 | 140 | 0.7 |
| Comp. Ex. 2 | — | PVA + PAANa (30) | — | 200 | 15 | 0.1 | Broken | 0 |

[*1]Unit: ml(STP)/m$^2$ · day · atm(Pa);
[*2]Unit: kg · f (15 mm wide).

The laminated films according to the present invention, in which PET, ONy, CPP and/or LLDPE were laminated on one side or both sides of the gas barrier film, had high oxygen gas barrier property even after the Gerbo test in which a sample was flexed 10 times. The laminated films, particularly the polyolefin-laminated films (Examples 1–5) were good in heat-sealing property and hence had performance suitable for packaging films. On the contrary, when the layer (the second layer) of the gas barrier film was heat-sealed, sealing was unsuccessful. In addition, this simple layer of the gas barrier film (Comparative Example 2) was fragile and hence broken by the Gerbo test.

We claim:

1. A gas barrier laminate having a laminated structure of at least two layers, which comprises a gas barrier film (A) formed from a mixture containing polyvinyl alcohol and poly(meth)acrylic acid or a partially neutralized product thereof in a weight ratio ranging from 95:5 to 10:90, and having an oxygen permeability constant of $1.25 \times 10^{-3}$ ml(STP)·cm/m$^2$·h·atm{Pa} or smaller as measured under conditions of 30° C. and 80% relative humidity, and a layer (B) formed from a thermoplastic resin, said film (A) and layer (B) being laminated contiguously to each other.

2. The gas barrier laminate as claimed in claim 1, wherein the gas barrier film (A) is a water-resistant film insoluble in boiling water.

3. The gas barrier laminate as claimed in claim 1, wherein the gas barrier film (A) has an oxygen permeability constant of $6.25 \times 10^{-4}$ ml(STP)·cm/m$^2$·h·atm{Pa} or smaller as measured under conditions of 30° C. and 80% relative humidity.

4. The gas barrier laminate as claimed in claim 1, wherein the polyvinyl alcohol has a saponification degree of at least 95% and an average polymerization degree ranging from 300 to 2,500.

5. The gas barrier laminate as claimed in claim 1, wherein the poly(meth)acrylic acid is polyacrylic acid, polymethacrylic acid, a copolymer of acrylic acid and methacrylic acid, or a mixture of at least two polymers thereof, and has a number average molecular weight ranging from 2,000 to 250,000.

6. The gas barrier laminate as claimed in claim 1, wherein the partially neutralized product of poly(meth)acrylic acid is obtained by partially neutralizing carboxyl groups of the poly(meth)acrylic acid with an alkali.

7. The gas barrier laminate as claimed in claim 1, wherein the partially neutralized product of poly(meth)acrylic acid has a degree of neutralization not higher than 20%, said degree of neutralization being a value determined by the following equation:

$$Degree\ of\ neutralization = (X/Y) \times 100\ [\%]$$

wherein X means the number of moles of carboxyl groups neutralized in 1 g of the partially neutralized poly(meth)acrylic acid, and Y denotes the number of moles of carboxyl groups in 1 g of the poly(meth)acrylic acid before the partial neutralization.

8. The gas barrier laminate as claimed in claim 1, wherein the partially neutralized product of poly(meth)acrylic acid has a degree of neutralization within a range of 3–15%.

9. The gas barrier laminate as claimed in claim 1, wherein the gas barrier film (A) is formed from a mixture containing the polyvinyl alcohol and the poly(meth)acrylic acid or the partially neutralized product thereof in a weight ratio ranging from 90:10 to 10:90.

10. The gas barrier laminate as claimed in claim 1, wherein the gas barrier film (A) is formed from a mixture containing the polyvinyl alcohol and the poly(meth)acrylic acid or the partially neutralized product thereof in a weight ratio ranging from 80:20 to 20:80.

11. The gas barrier laminate as claimed in claim 1, wherein the layer (B) formed from the thermoplastic resin is a heat-resistant film formed from a thermoplastic resin having a melting point or Vicat softening point of at least 180° C.

12. The gas barrier laminate as claimed in claim 11, wherein a sealing layer (C) formed from a thermoplastic resin having a melting point or Vicat softening point lower than 180° C. is additionally laminated contiguously to either the gas barrier film (A) or the heat-resistant film (B).

13. The gas barrier laminate as claimed in claim 12, which has a laminated structure of the heat-resistant film (B)/the gas barrier film (A)/the sealing layer (C).

* * * * *